(12) United States Patent
Cavanaugh

(10) Patent No.: US 7,533,388 B1
(45) Date of Patent: May 12, 2009

(54) METHOD AND APPARATUS FOR DYNAMIC STUBS AND TIES IN RMI-IIOP

(75) Inventor: Ken M. Cavanaugh, Montara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 947 days.

(21) Appl. No.: 11/117,221

(22) Filed: Apr. 28, 2005

(51) Int. Cl.
*G06F 13/00* (2006.01)

(52) U.S. Cl. .................. 719/330; 719/316; 709/203

(58) Field of Classification Search .......... 719/330, 719/316; 709/203
See application file for complete search history.

(56) References Cited

U.S. PATENT DOCUMENTS

| | | | |
|---|---|---|---|
| 5,737,607 A * | 4/1998 | Hamilton et al. | 719/316 |
| 6,947,965 B2 * | 9/2005 | Glass | 709/203 |
| 2005/0240945 A1 * | 10/2005 | Glass | 719/330 |
| 2006/0059195 A1 * | 3/2006 | Hall et al. | 707/103 Y |

OTHER PUBLICATIONS

Sun Microsystems. *Java API for XML-Based RPC Specification* 1.0, Jun. 11, 2002.

*Java to IDL Language Mapping Specification*, version 1.3, Sep. 22, 2003.

*Java RMI Release Notes for J2SE 5.0*, 2004.

\* cited by examiner

*Primary Examiner*—Andy Ho
(74) *Attorney, Agent, or Firm*—Robert C. Kowert; Meyertons, Hood, Kivlin, Kowert & Goetzel, P.C.

(57) ABSTRACT

Method and apparatus for the dynamic generation of Stubs and Ties in RMI-IIOP implementations. In embodiments, dynamic RMI-IIOP may generate Stubs and Ties as needed at runtime, rather than statically generating Stubs and Ties. In embodiments, the dynamic RMI-IIOP mechanism may be implemented as part of the ORB architecture, rather than as part of the application server architecture. In one embodiment, Ties may be dynamically generated by the server-side ORB using reflection. In embodiments, different mechanisms may be provided for dynamically generating Stubs on the client-side ORB. These mechanisms may include a dynamic proxy mechanism and an external library mechanism. One embodiment may provide a pluggable interface to the client-side ORB through which different dynamic Stub mechanisms may be plugged in. Some embodiments of dynamic RMI-IIOP may be configured to load statically generated Stubs for client processes where dynamic Stubs are not supported.

54 Claims, 10 Drawing Sheets

METHOD AND APPARATUS FOR DYNAMIC STUBS AND TIES IN RMI-IIOP

BACKGROUND OF THE INVENTION

1. Field of the Invention

This invention relates to network computing, and more particularly to the dynamic generation of Stubs and Ties for remote method invocations in RMI-IIOP implementations.

2. Description of the Related Art

RMI

RMI (Remote Method Invocation) is a way that a programmer, using the Java programming language and development environment, can write object-oriented programs in which objects on different computers can interact in a distributed network. RMI is the Java version of what is generally known as a remote procedure call (RPC), but with the ability to pass one or more objects along with the request. The object can include information that will change the service that is performed in the remote computer. The object parameter-passing mechanism may be referred to as object serialization. An RMI request is a request to invoke the method of a remote object. The request has the same syntax as a request to invoke an object method in the same (local) computer. In general, RMI is designed to preserve the object model and its advantages across a network.

RMI may be implemented as three layers:

A Stub (proxy) program in the client side of the client/server relationship, and a corresponding skeleton or Tie at the server end. The Stub appears to the calling program to be the program being called for a service.

A Remote Reference Layer that can behave differently depending on the parameters passed by the calling program. For example, this layer can determine whether the request is to call a single remote service or multiple remote programs as in a multicast.

A Transport Connection Layer, which sets up and manages the request.

A single request travels down through the layers on one computer and up through the layers at the other end.

CORBA, IIOP, and ORB

IIOP (Internet Inter-ORB Protocol) is a protocol that makes it possible for distributed programs written in different programming languages to communicate over the Internet. IIOP is a critical part of an industry standard, the Common Object Request Broker Architecture (CORBA). CORBA is an architecture and specification for creating, distributing, and managing distributed program objects in a network. CORBA allows programs at different locations and developed by different vendors to communicate in a network through a broker that mediates remote requests.

An essential concept in CORBA is the Object Request Broker (ORB). An Object Request Broker (ORB) acts as a "broker" between a client request for a service from a distributed object or component and the completion of that request. ORB support in a network of clients and servers on different computers means that a client program (which may itself be an object) can request services from a server program or object without having to understand where the server is in a distributed network or what the interface to the server program looks like. Using ORBs, components can find out about each other and exchange interface information as they are running. To make requests or return replies between the ORBs, programs may use the General Inter-ORB Protocol (GIOP) and, for TCP/IP, Internet Inter-ORB Protocol (IIOP). IIOP maps GIOP requests and replies to the Internet's Transmission Control Protocol (TCP) layer in each computer. CORBA and IIOP assume the client/server model of computing in which a client program makes requests and a server program waits to receive requests from clients.

An object adapter is a subcomponent in ORB that connects a request using an object reference with the proper code to service that request. The Portable Object Adapter, or POA, is a particular type of object adapter that is defined by the CORBA specification. A POA object manages the implementation of a collection of objects. The POA supports a name space for the objects, which are identified by Object IDs. A POA also provides a name space for POAs. A POA is created as a child of an existing POA, which forms a hierarchy starting with the root POA. POAs may be transient or persistent.

RMI-IIOP

When a client communicates with a server using the IIOP protocol to access RMI objects on the server, the communication process may be referred to as RMI-IIOP because calls from the client target RMI objects on the server, and access to the RMI objects on the server is enabled through an IIOP mechanism.

IDL

Java Interface Definition Language (IDL) adds CORBA capability to the Java platform, providing standards-based interoperability and connectivity. Java IDL enables distributed Java applications to transparently invoke operations on remote network services using the industry standard OMG IDL (Object Management Group Interface Definition Language) and IIOP. Java IDL technology may be used by CORBA programmers who want to program in the Java programming language based on interfaces defined in CORBA Interface Definition Language (IDL).

EJB

Enterprise JavaBeans (EJB) is an architecture for setting up program components, written in the Java programming language, that run in the server parts of a computer network that uses the client/server model. Enterprise JavaBeans offers enterprises the advantage of being able to control change at the server rather than having to update each individual computer with a client whenever a new program component is changed or added. EJB components have the advantage of being reusable in multiple applications. To deploy an EJB component, it must be part of a specific application, which is called a container. The application or container that hosts the EJBs may be referred to as an application server. A typical use of EJBs is to replace Web programs that use the common gateway interface (CGI) and a Practical Extraction and Reporting Language (PERL) script. Another general use is to provide an interface between Web users and a legacy application mainframe application and its database.

RMIC

RMIC (RMI Compiler) is a Java RMI Compiler. RMIC generates Stubs, skeletons, and Ties for remote objects using either the JRMP or IIOP protocols. RMIC also generates OMG IDL. The RMIC compiler generates Stub and skeleton class files (JRMP protocol), and Stub and Tie class files (IIOP protocol) for remote objects. These class files are generated from the compiled Java programming language classes that contain remote object implementations. In Java, a remote object is one that implements the interface java.rmi.Remote.

FIG. 1 is a block diagram illustrating a conventional RMI-IIOP implementation. A client process 110 is shown using RMI-IIOP through client-side ORB 114 and server-side ORB 104 to access EJB(s) 106 on container 100. A container 100 is an entity that provides life cycle management, security, deployment, and runtime services to objects such as EJBs. Stubs 112 on the client side and Ties 102 on the server side provide the interfaces for the client process 110 to remotely invoke methods provided by EJB(s) 106 on the server side. Client-side ORB 114 and server-side ORB 104 handle the communication of the requests and response messages generated by the remote method invocations using RMI-IIOP.

Remote Method Invocation (RMI) systems such as RMI-IIOP conventionally rely on tools such as RMI Compiler (RMIC) to statically generate Stubs 112 and Ties 102. A conventional model for RMI is to first compile a remote interface and its implementation, and then use RMIC or a similar tool to generate static Stubs, skeletons and Ties. This requires that RMIC analyze a lot of information, either by using a Java compiler front end, or by using a library that enables the reading of class files. RMIC must then write out a number of Java source files for Stubs and Ties to a file system, and then finally invoke the Java compiler to generate the class files for the Stubs and Ties, which are then loaded in the usual manner through a ClassLoader.

SUMMARY

Embodiments of a method and apparatus for the dynamic generation of Stubs and Ties in RMI-IIOP implementations are described. In embodiments, a dynamic RMI-IIOP implementation may dynamically generate code for Stubs and Ties as needed at runtime using dynamic Stub and Tie generation mechanisms, rather than statically generating Stubs and Ties as in conventional RMI-IIOP implementations, thus avoiding the overhead of file system I/O and speeding up EJB deployment in application servers. In embodiments, the dynamic RMI-IIOP mechanisms may be implemented as part of the ORB architecture, rather than as part of the application server architecture, thus making dynamic RMI-IIOP as described herein independent of the application server, and therefore applicable in other environments and products than application server environments and products. Rather than introducing new, custom class loaders for dynamic Stubs and Ties, embodiments of dynamic RMI-IIOP may use existing class loaders, and may leverage reflective APIs to cause classes to be loaded by the class loader even though the classes are not being loaded by the VM directly.

In one embodiment, a client-side ORB may generate, at runtime, a dynamic Stub as a remote interface to an object (e.g., an EJB) hosted on an application server. The client and the application server may be co-located in the same address space (e.g., Virtual Machine), or alternatively may be located on different address spaces (e.g., different Virtual Machines). In one embodiment, dynamic Stubs may be generated on an "as needed" basis, i.e. a dynamic Stub may be generated only when a client process needs to invoke a remote object hosted by an application server, as opposed to statically generating Stubs "up front" as in conventional RMI-IIOP implementations.

Various embodiments may provide one or more mechanisms to generate dynamic Stubs and Ties at runtime. In one embodiment, a Reflection mechanism may be used to dynamically generate Ties at runtime. In one embodiment, a dynamic proxy mechanism provided by the Java Developer's Kit (JDK) may be used to dynamically generate Stubs at runtime. In another embodiment, an external library mechanism may be used to dynamically generate Stubs at runtime. In this embodiment, an external library may provide a set of APIs to create Java classes, including methods and data members in the classes, and to generate the code and methods for defining the Java class directly in memory rather than going through the conventional compilation route. In one embodiment, the mechanisms for dynamically generating Stubs may be pluggable into the client-side dynamic RMI-IIOP implementation (i.e., into the client-side ORB architecture), allowing the dynamic mechanisms for generating Stubs to be plugged in and used as necessary or desired. In one embodiment of dynamic RMI-IIOP, dynamic Stubs may be used exclusively in an application server implemented using dynamic RMI-IIOP for all RMI-IIOP cases where dynamic Stubs are possible, i.e. in all cases where client-side ORBs are used that support dynamic RMI-IIOP. Note that, in one embodiment, the client-side ORB may be configured to load static Stubs as remote interfaces to objects hosted on application servers for client processes that do not support the generation of dynamic Stubs at runtime.

After the dynamic Stub is generated, a client process may initiate an invocation of a method of the object hosted on the application server via the dynamic Stub. The client-side ORB may communicate the invocation to a server-side ORB in accordance with RMI-IIOP. The server-side ORB may generate, at runtime, a dynamic Tie for invoking methods of the object hosted on the application server. In one embodiment, the server-side ORB may generate the dynamic Tie in response to the invocation on the object received from the server-side ORB. Alternatively, the dynamic Tie may be generated prior to receiving the invocation from the client-side ORB. In one embodiment, the server-side ORB may generate the dynamic Tie using reflection. The method of the object hosted on the application server may then be invoked via the dynamic Tie.

Figure 1:
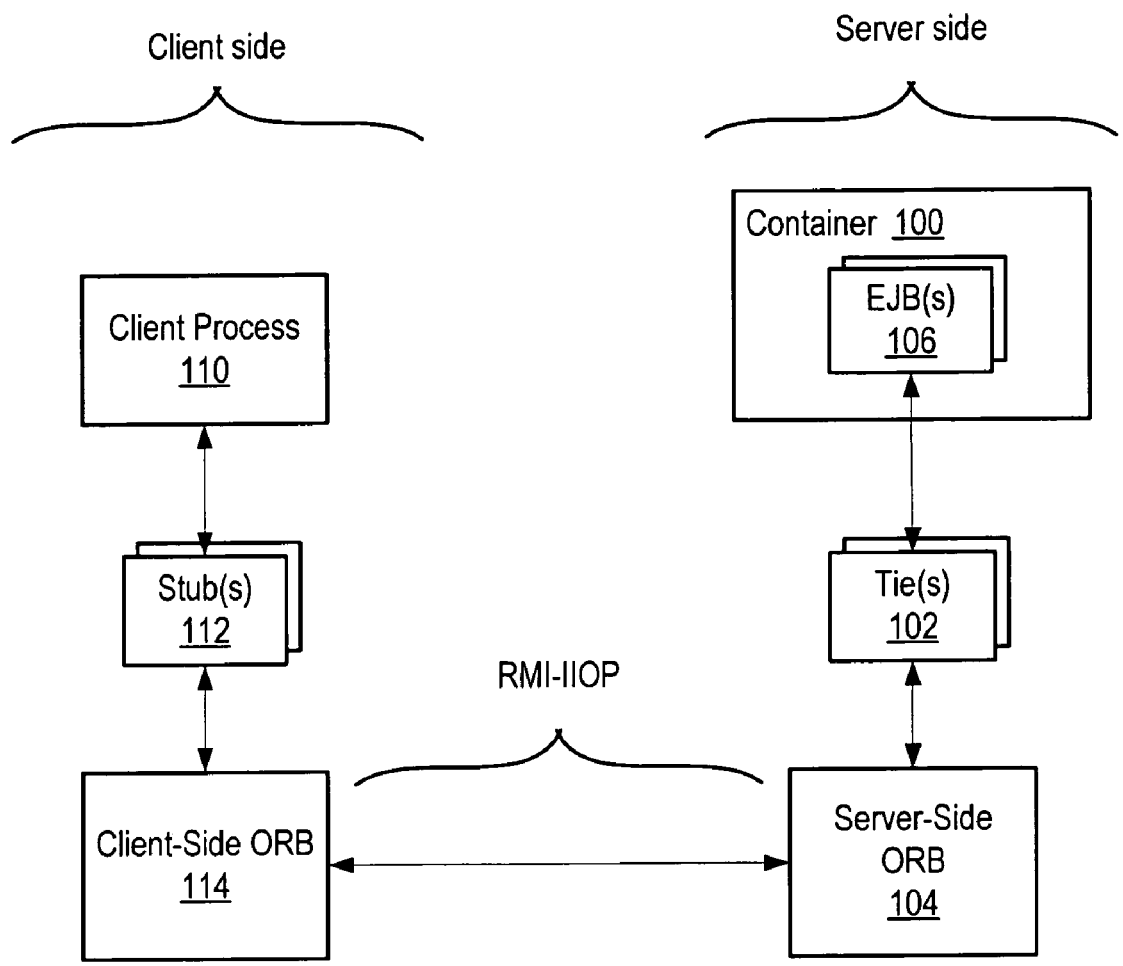
FIG. 1 is a block diagram illustrating a conventional RMI-IIOP client-server implementation.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a method and apparatus for the dynamic generation of Stubs and Ties in RMI-IIOP implementations are described. Embodiments may provide one or more mechanisms for RMI-IIOP implementations to generate Stubs and Ties dynamically at runtime. An RMI-IIOP implementation that dynamically generates Stubs and Ties according to an embodiment may be referred to herein as dynamic RMI-IIOP. A dynamic RMI-IIOP implementation may dynamically generate code for Stubs and Ties as needed at runtime using a dynamic Stub/Tie generation mechanism or mechanisms as described herein, rather than statically generating Stubs and Ties as in conventional RMI-IIOP implementations, thus avoiding the overhead of file system I/O and speeding up EJB deployment in application servers. Note that embodiments of dynamic RMI-IIOP may support statically-generated Stubs and Ties where necessary in addition to dynamically-generated Stubs and Ties.

Embodiments of the dynamic RMI-IIOP mechanism for dynamically generating Stubs and Ties at runtime may be implemented as part of the ORB architecture, rather than as part of the application server architecture, thus allowing dynamic RMI-IIOP as described herein to be independent of the application server, and therefore applicable in other environments and products than application server environments and products.

Various embodiments may provide one or more mechanisms to generate dynamic Stubs and Ties at runtime. The Java programming language and environment provides the ability for byte code to be generated in an array in memory and then loaded through a class loader, avoiding the overhead of file I/O and invocation of a Java compiler. In one embodiment, a dynamic proxy mechanism provided by the Java Developer's Kit (JDK) may be used to dynamically generate Stubs and/or Ties at runtime. In another embodiment, an external library mechanism may be used to dynamically generate Stubs and/or Ties at runtime. In this embodiment, an external library may provide a set of APIs to create Java classes, including methods and data members in the classes, and to generate the code and methods for defining the Java class directly in memory rather than going through the conventional compilation route. Exemplary external libraries that may be used in embodiments may include, but are not limited to, Apache Software Foundation's BCEL (Byte Code Engineering Library), the ObjectWeb Consortium's ASM, and SolarMetric's Serp.

Some embodiments may use either one or both of a dynamic proxy mechanism and an external library mechanism to dynamically generate Stubs at runtime. In one embodiment, the mechanisms for dynamically generating Stubs may be pluggable into the client-side dynamic RMI-IIOP implementation, allowing the dynamic mechanisms for generating Stubs described herein to be plugged in and used as necessary or desired.

In one embodiment of dynamic RMI-IIOP, dynamic Stubs may be used exclusively in an application server implemented using dynamic RMI-IIOP for all RMI-IIOP cases where dynamic Stubs are possible, i.e. in all cases when client-side ORBs are used that support dynamic RMI-IIOP. Note that static Stubs may be used in cases where an EJB is deployed that must be accessible to a client process written using an ORB that does not support dynamic RMI-IIOP.

Embodiments of dynamic RMI-IIOP may not introduce a new or custom class loader. Application servers strive to enforce isolation between different components deployed in the server. Many application servers do this by loading different components into different class loader instances. For example, the Sun application server uses a different class loader for each EAR file, which contains one or more EJB definitions. As a consequence, there is significant complexity in the application server associated with managing class loaders. Because the ORB is a separate component from the app server, the ORB does not create or manage any class loaders of its own.

Conventionally, to load a class, a current class loader is defined, typically through a context class loader. Whenever the VM encounters a reference to a class that it does not know about, it finds a current class loader and invokes a method on the class loader to cause the class to be loaded. Rather than introducing new, custom class loaders for dynamic Stubs and Ties, embodiments of dynamic RMI-IIOP may use existing class loaders, and may leverage reflective APIs to cause classes to be loaded by the class loader even though the classes are not being loaded by the VM directly. One embodiment of dynamic RMI-IIOP may use a readResolve/writeReplace mechanism, further described below, to avoid requiring a new class loader.

Embodiments of dynamic RMI-IIOP may support the streaming of RMI-IIOP messages. Embodiments may not require the server (or client) to receive an entire message object and convert the message object into some other representation for processing. In embodiments, rather than requiring the server (or client) to receive an entire RMI-IIOP message before processing the message, when a client starts sending an RMI-IIOP message, processing of the message may be begun by the server before the entire message is received, and vice versa. For example, if there is a message that is several megabytes long, a dynamic RMI-IIOP implementation may be able to send the first N bytes, and then begin processing of the message on the server side before the entire message is received. Since the streaming of RMI-IIOP messages in dynamic RMI-IIOP allows the processing of a message to begin before the entire message is received, embodiments may also provide a mechanism by which the server may read a portion of a message, discover an error, and then signal the error back to the client, possibly before the client finishes sending the message.

Figure 2:
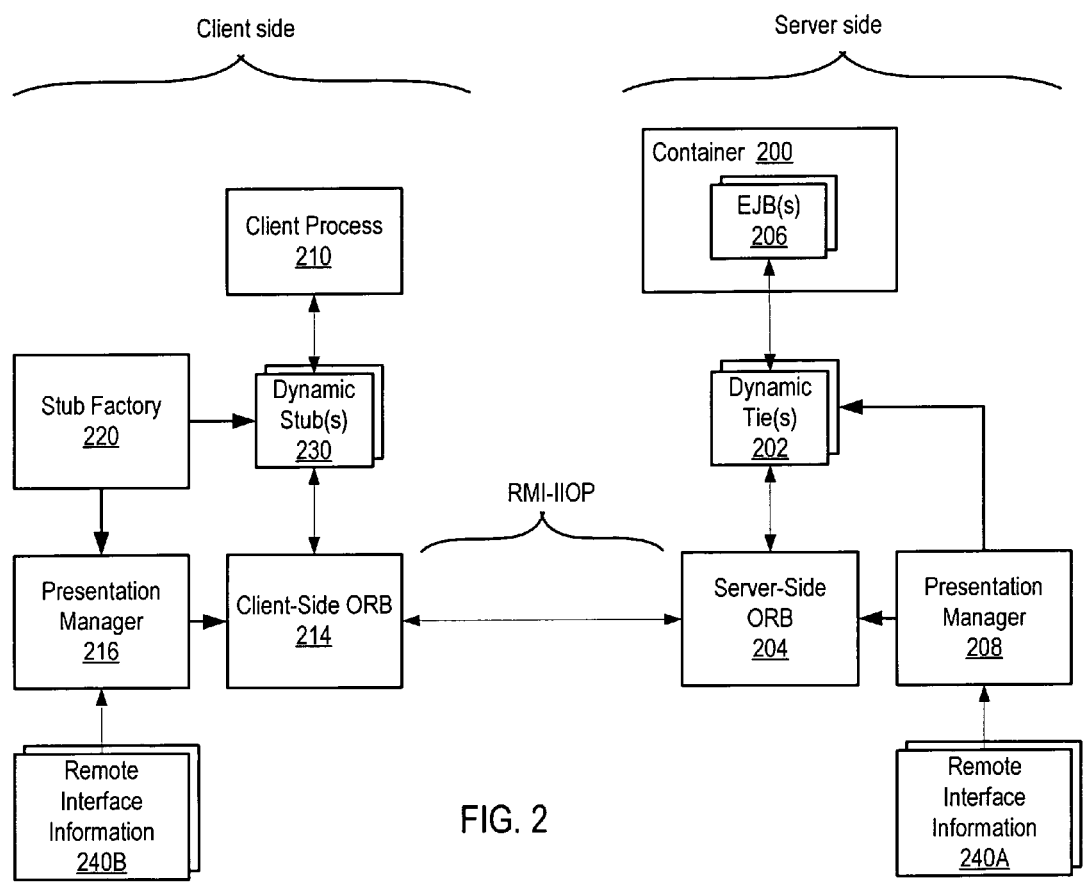
FIG. 2 is a block diagram illustrating an exemplary dynamic RMI-IIOP client-server implementation according to one embodiment.

FIG. 2 is a block diagram illustrating an exemplary dynamic RMI-IIOP client-server implementation according to one embodiment. A Presentation Manager may be a component of the ORB architecture. A server-side Presentation Manager 208 instance may be configured to generate dynamic Ties 202 for remote interfaces to EJBs 206 at runtime according to remote interface information 240A. A client-side Presentation Manager 216 instance may be configured to generate dynamic Stubs 230 for remote interfaces to EJBs 206 at runtime according to remote interface information 240B. Note that the client-side remote interfaces (Stubs 230) and the server-side remote interfaces (Ties 202) are closely related. Typically, these interfaces include the same remote methods, although all that is required is that every method in the client-side remote interfaces is represented in the server-side remote interfaces. The server's remote interfaces may include remote methods not present in a client's remote interfaces.

In one embodiment, the client-side Presentation Manager 216 may include a mechanism for plugging in a Stub Factory 220. Embodiments may provide two or more implementations of Stub Factory 220 that may be plugged in to the client-side Presentation Manager 216; each Stub Factory 220 may implement a different mechanism for generating dynamic Stubs 220. Exemplary dynamic Stub mechanisms are described below. In one embodiment, a pluggable Stub Factory 220 may be provided that is configured to load static Stubs when necessary. Thus, in some embodiments, both static and dynamic Stubs may be supported. One embodiment may provide the capability to load static Stubs when necessary, for example to load static Stubs for beans deployed for a third-party application that does not use an ORB that supports dynamic RMI-IIOP ORB, but otherwise may use only dynamically-generated Stubs for the normal operations of the application server.

Presentation Manager

Embodiments of dynamic RMI-IIOP do not rely on statically generated code for Stubs and Ties. In one embodiment, class analysis that is conventionally performed by RMIC is instead performed dynamically in the ORB implementation. Embodiments of dynamic RMI-IIOP may be a feature of the ORB architecture rather than a feature of the application server. Embodiments may interact with and complement other features in the ORB, for example argument copying optimization. In one embodiment, a Presentation Manager that is configured to dynamically perform the class analysis may be provided as a component of the ORB architecture for both the client-side ORB and the server-side ORB. In one embodiment, the Presentation Manager may be a plug-in point that supports dynamic RMI-HOP within the ORB architecture.

In an exemplary embodiment, the Presentation Manager may provide the following interface:

public interface PresentationManager {
ClassData getClassData(Class cls);
DynamicMethodMarshaler getDynamicMethodMarshaler(Method method);
StubFactoryFactory getStubFactoryFactory(boolean is Dynamic);
void setStubFactoryFactory(boolean is Dynamic, StubFactoryFactory sff);
Tie getTie( );
boolean useDynamicStubs( );
};

The ClassData may provide access to the IDLNameTranslator, which translates between the RMI-IIOP method name passed on the GIOP request and the Java method represented by this name. The ClassData may also provide the repository IDs for the remote interface, and an InvocationHandlerFactory that may be used in dynamic Stubs. ClassData may also provide a mechanism to obtain marshaling information via the DynamicMethodMarshaler.

ClassData may provide mechanisms to analyze a remote interface, and to determine all the data structures associated with that remote interface that are needed to do RMI-IIOP. ClassData may be used to map between the Java methods and corresponding IDL operation names. Note that IDL does not support the overloading of method names, but Java does. In Java, for example, there may be a "hello" method on a foo( ) interface that takes an integer and another "hello" method on the foo( ) interface that takes a String. Both methods cannot be called "hello" when mapped to IDL. ClassData may provide a mechanism or mechanisms that supports the mapping of overloaded method names from Java to IDL according to the RMI-IIOP specification.

The DynamicMethodMarshaler may provide a uniform interface for reading and writing arguments, results, and exceptions for a particular method.

The StubFactoryFactory may be used whenever the ORB needs to obtain a StubFactory that can create a Stub. For example, whenever an object reference is unmarshaled, the ORB will attempt to get a Stub for the object reference.

getTie returns a Dynamic Tie which can be used anywhere an RMI-IIOP Tie is needed (typically in a Portable Object Adapter (POA)).

In some embodiments, the ClassData and the DynamicMethodMarshaler(s) may be expensive to compute, so one or both may be cached in the implementation of the Presentation Manager.

Multiple instances of an ORB may be created in the same address space. This allows for scoping and controlling what quality of service is being used for different requests and different object creations within each ORB. In one embodiment, rather than having a Presentation Manager instance for each ORB, there may be only one Presentation Manager instance in an address space that is shared by all ORB instances within the same address space. In one embodiment, a system property may be set to indicate which Stub Factory is being used. The Presentation Manager itself may be fixed because, except for the StubFactoryFactory method, the methods may be general-purpose mechanisms. In one embodiment, different dynamic Stub mechanisms, as described herein, may be plugged in through the StubFactoryFactory method.

Some embodiments may simultaneously support both static Stubs and dynamic Stubs because both IDL and RMI-IIOP may have to be supported. In IDL, Stubs are generated directly from an IDL interface, and thus have to be generated statically. For RMI-IIOP, Stubs may be generated statically and/or dynamically. In one embodiment, for static Stubs, a Stub Factory may be plugged in that is always the same; for dynamic Stubs, either a Stub Factory for the external library dynamic Stub mechanism or for the dynamic proxy Stub mechanism may be plugged in. Thus, in one embodiment, there may be three different types of Stub Factory that may be plugged in. Note that other embodiments may provide less than three or more than three different types of Stub Factories.

Dynamic Ties

Conventionally, RMI-IIOP implementations that use RMIC generate static Ties. Embodiments may provide a dynamic Tie generation mechanism that dynamically generates Ties using reflection. FIG. 2 illustrates a server-side ORB implementation including a Presentation Manager 208 that generates dynamic Ties 202 according to one embodiment.

Tie extends class org.org.CORBA.portable.InvokeHandler. A Tie class should extend org.omg.PortableServer.Servant so that the Tie can be used in a Portable Object Adapter (POA), and should implement javax.rmi.CORBA.Tie, as required by the OMG RMI-IIOP specification. An exemplary Tie interface that may be used in embodiments is as follows:

```
public interface Tie extends org.omg.CORBA.portable.InvokeHandler {
  org.omg.CORBA.Object thisObject( );
  void deactivate( ) throws java.rmi.NoSuchObjectException;
  ORB orb( );
  void orb(ORB orb);
  void setTarget(java.rmi.Remote target);
  java.rmi.Remote getTarget( );
}
public interface InvokeHandler {
  OutputStream _invoke(String method, InputStream input, ResponseHandler handler);
}
```

The setTarget method may be used to set the actual implementation of a remote object that is to be used in this Tie. The InvokeHandler includes a method that gives the Tie access to all the information about the operation name and marshaling stream. The invoke method may be used by the ORB to perform the actual invocation in the server of the remote operation named by the method String. In one embodiment, this invocation may be implemented as follows:

Obtain the actual Java method to be invoked from the method String (this may be complicated, due to the complex name mangling rules defined by the RMI-IIOP specification).

Unmarshal the arguments for this operation from the InputStream.

Invoke the actual method on the target (which was set by the SetTarget call) with the arguments that were unmarshaled.

Use the ResponseHandler to create an appropriate type of response for the request as an OutputStream.

Write the results of the invocation to the OutputStream, which is the result of the _invoke call.

For static Ties, the above may be accomplished through generated code. The first action (obtaining the Java method to be invoked) may be done with a case statement that effectively maps from the method name in the _invoke call to the Java method as found in the generated code. Specific arguments are unmarshaled, and then passed in a call to the _invoke method. The result is marshaled to the OutputStream using a method appropriate to the declared type of the result. This means that there is a specific Tie class for each type of remote object.

In one embodiment of dynamic RMI-IIOP, there may be only one type of Tie, such as the com.sun.corba.se.impl.presentation.rmi.ReflectiveTie class. This class may act as a Tie for any valid remote interface. An instance of the Tie class discovers what kind of Tie it is by reflectively analyzing the Class of the target in the setTarget call. The setTarget call uses the Presentation Manager to obtain the ClassData. In one embodiment, the _invoke method may then be implemented as follows:

Use the IDLNameTranslator to get the Java Method from the method passed into the _invoke( ) call.

Use the Presentation Manager to get the DynamicMethodMarshaler from the Java method. Unmarshal the arguments using the DynamicMethodMarshaler.

Invoke the method with the target and the unmarshaled arguments using Java reflection.

Use the ResponseHandler to create the result OutputStream.

Use the DynamicMethodMarshaler to write the results to the result OutputStream.

Ties may only be used in the case of a remote invocation. The cost of a remote invocation may be dominated by two factors: the cost of the data transfer, and the cost of marshaling the data. Compared to these two factors, any extra overhead of the dynamic, reflective Ties when compared to static Ties may be negligible.

Stubs

With Ties, the application server is in control of when it needs to obtain a Tie, which is when it is implementing a servant, which means that it has to register the servant with a Portable Object Adapter (POA). In the case of Stubs, the ORB at times may have to create a Stub itself. The client-side ORB may create a Stub in cases including, but not limited to:

When a remote object is unmarshaled (e.g., in CDRInputStream_1_0)

When a remote object is narrowed (an operation to set the correct type)

When PortableRemoteObject.toStub, part of the standard RMI-IIOP interface, is called The creation of a Stub may be handled by the Utility.loadStub method. This method may handle both RMI-IIOP and IDL Stubs. Conventionally, both cases are handled by calling Class.newInstance on the appropriate Stub class. This call to Class.newInstance uses the Class object as a factory for the Stub. IDL requires compiler-generated, static Stubs because the IDL Stub requires parsing of the IDL language definition of the interface.

In implementing dynamic RMI-IIOP with dynamic Stubs, there may not be a Class available to use as a factory. It may be possible to create a custom ClassLoader to support dynamic Stubs, but this may make ORB integration with the application server more difficult. In one embodiment, dynamic RMI-IIOP may include a StubFactory for generating dynamic and/or loading static Stubs. In one embodiment, for static Stubs, the StubFactory may simply call Class.newInstance to load a static Stub.

As previously mentioned, one embodiment of dynamic RMI-IIOP may provide a mechanism for implementing dynamic Stubs that uses the JDK dynamic proxy mechanism, and another embodiment may provide a mechanism that generates dynamic Stubs at runtime using an external library such as the Apache BCEL library. Alternatively, an embodiment may provide both mechanisms as alternatives, and/or the dynamic Stub generation mechanism may be "pluggable" to allow either dynamic Stub generation mechanism to be plugged into the dynamic RMI-IIOP implementation. These mechanisms may be compared in ways including one or more of, but not limited to:

RMI-IIOP Specification Compliance. javax.rmi.CORBA.Stub is a class, not an interface. The RMI-IIOP specification requires that all RMI-IIOP Stubs extend the Stub class. This means that dynamic proxies may not be used to create a fully compliant RMI-IIOP Stub.

Java standards compliance. Dynamic proxies are part of the JDK and are well supported. External libraries such as the BCEL library are not a standard API.

Simplicity. It may be easier in terms of the overall Stub architecture to use an external library such as BCEL rather than dynamic proxies. This is due to the lack of problems relating to the javax.rmi.CORBA.Stub base class when the external library mechanism is used.

Performance. The external library dynamic Stub mechanism may be faster than the dynamic proxy mechanism. This may at least in part be due to the ability to tune the code generation to the needs of Stubs using external libraries, rather than requiring a general framework to be used.

In one embodiment, the Utility.loadStub method may interact with the Presentation Manager to access the particular Stub Factory that is plugged in. Thus, the Stub may be loaded as a static Stub or, alternatively, generated as a dynamic Stub using whichever dynamic Stub mechanism is plugged into StubFactoryFactory.

Figure 3:
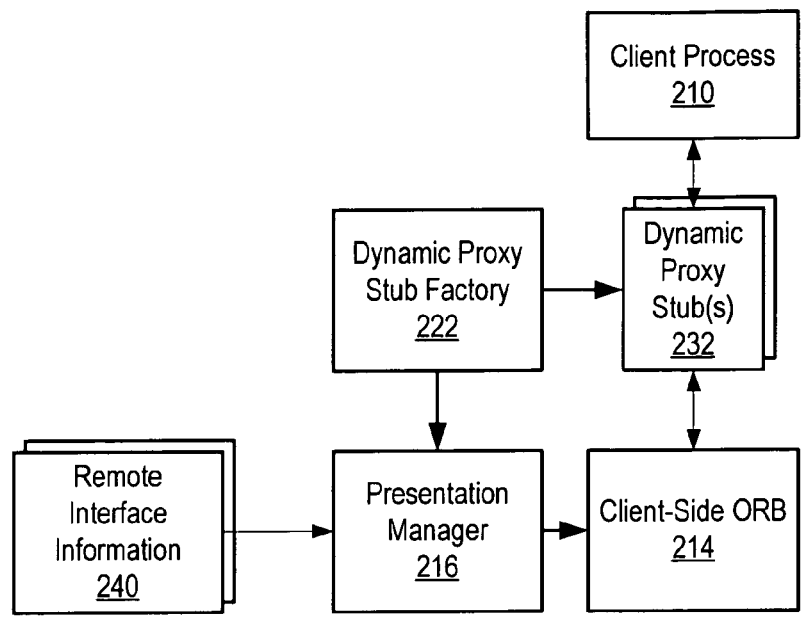
FIG. 3 is a block diagram illustrating the client side of an exemplary dynamic RMI-IIOP client-server implementation using a dynamic proxy Stub mechanism to dynamically generate Stubs for a remote interface according to one embodiment.
Figure 8:
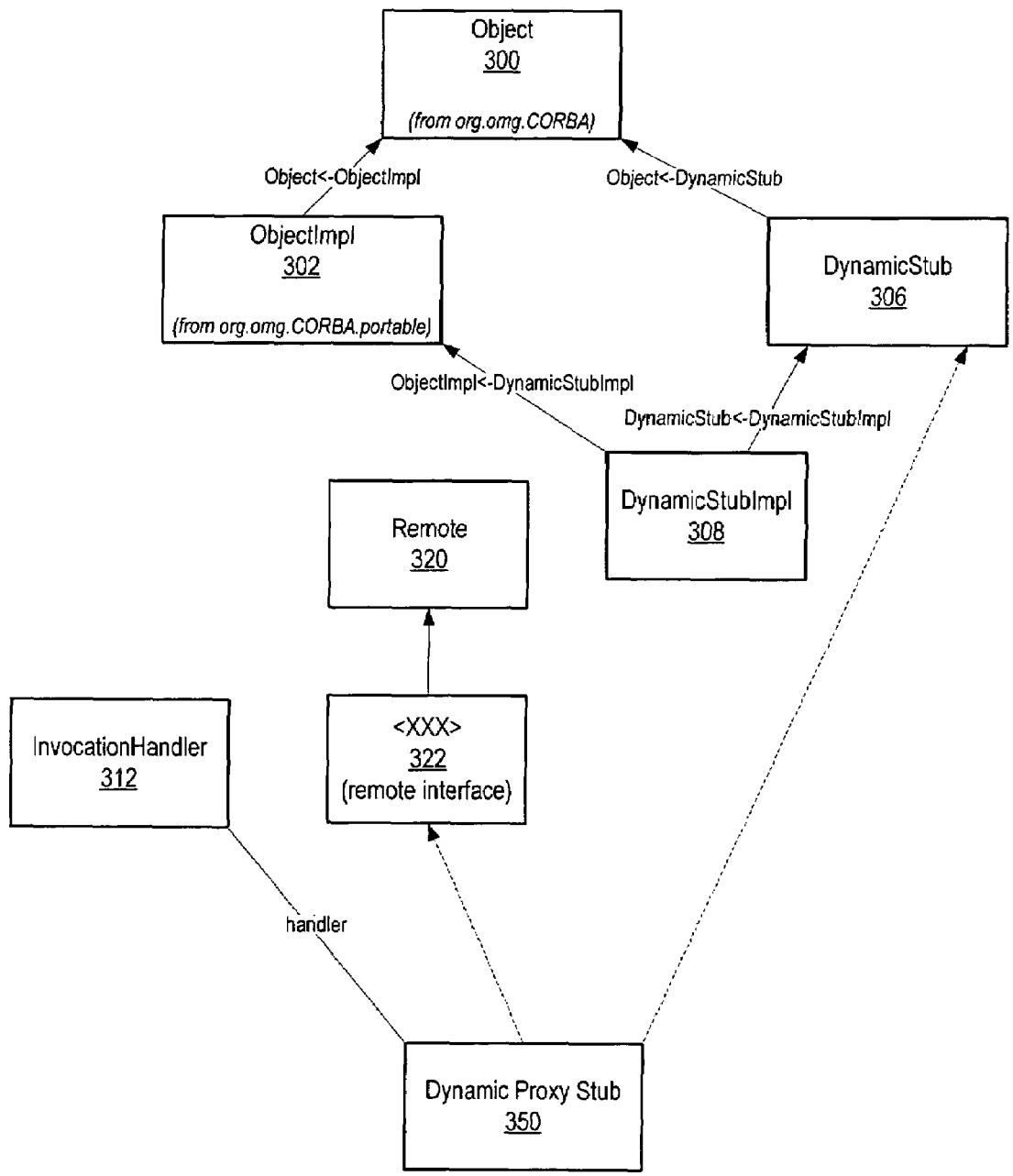
FIG. 8 illustrates an exemplary class architecture for dynamic proxy Stubs dynamically generated using a dynamic proxy mechanism according to one embodiment.

FIG. 3 is a block diagram illustrating the client side of an exemplary dynamic RMI-IIOP client-server implementation using a dynamic proxy Stub mechanism to dynamically generate Stubs for a remote interface according to one embodiment. In one embodiment, Presentation Manager 216, which may be a component of the ORB architecture, may provide an interface that allows Stub-generating mechanisms, or Stub Factories, to be plugged in to support different types of Stub generation, which may include one or more dynamic Stub generation and static Stub loading mechanisms. In FIG. 3, a Dynamic Proxy Stub Factory 222 configured to generate dynamic proxy Stubs 232 for a remote interface at runtime according to remote interface information 240 is plugged into the Presentation Manager 216. FIG. 8 illustrates an exemplary class architecture for dynamic proxy Stubs 232. Note that, in another embodiment, Presentation Manager 216 may be configured to always use a dynamic proxy Stub mechanism to generate dynamic Stubs for remote interfaces.

Figure 4:
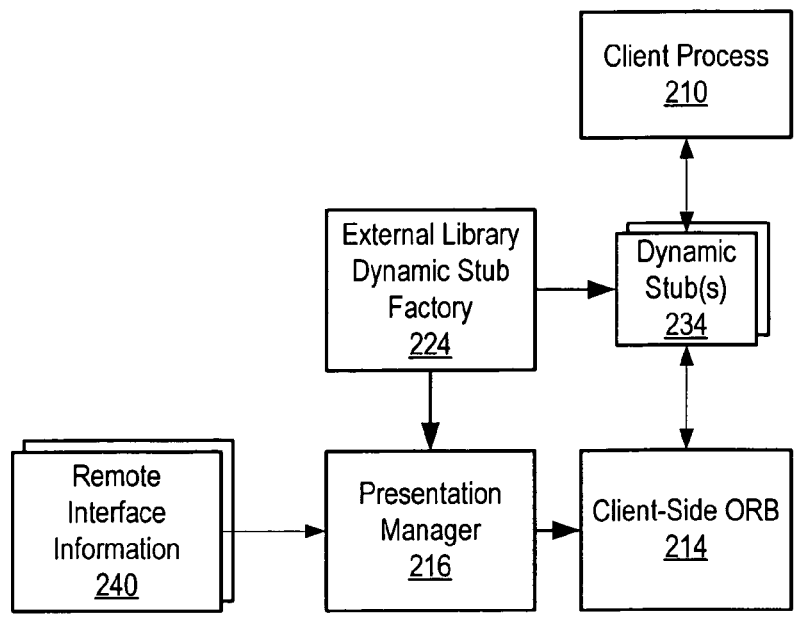
FIG. 4 is a block diagram illustrating the client side of an exemplary dynamic RMI-IIOP client-server implementation using an external library dynamic Stub mechanism to dynamically generate Stubs for a remote interface according to one embodiment.
Figure 9:
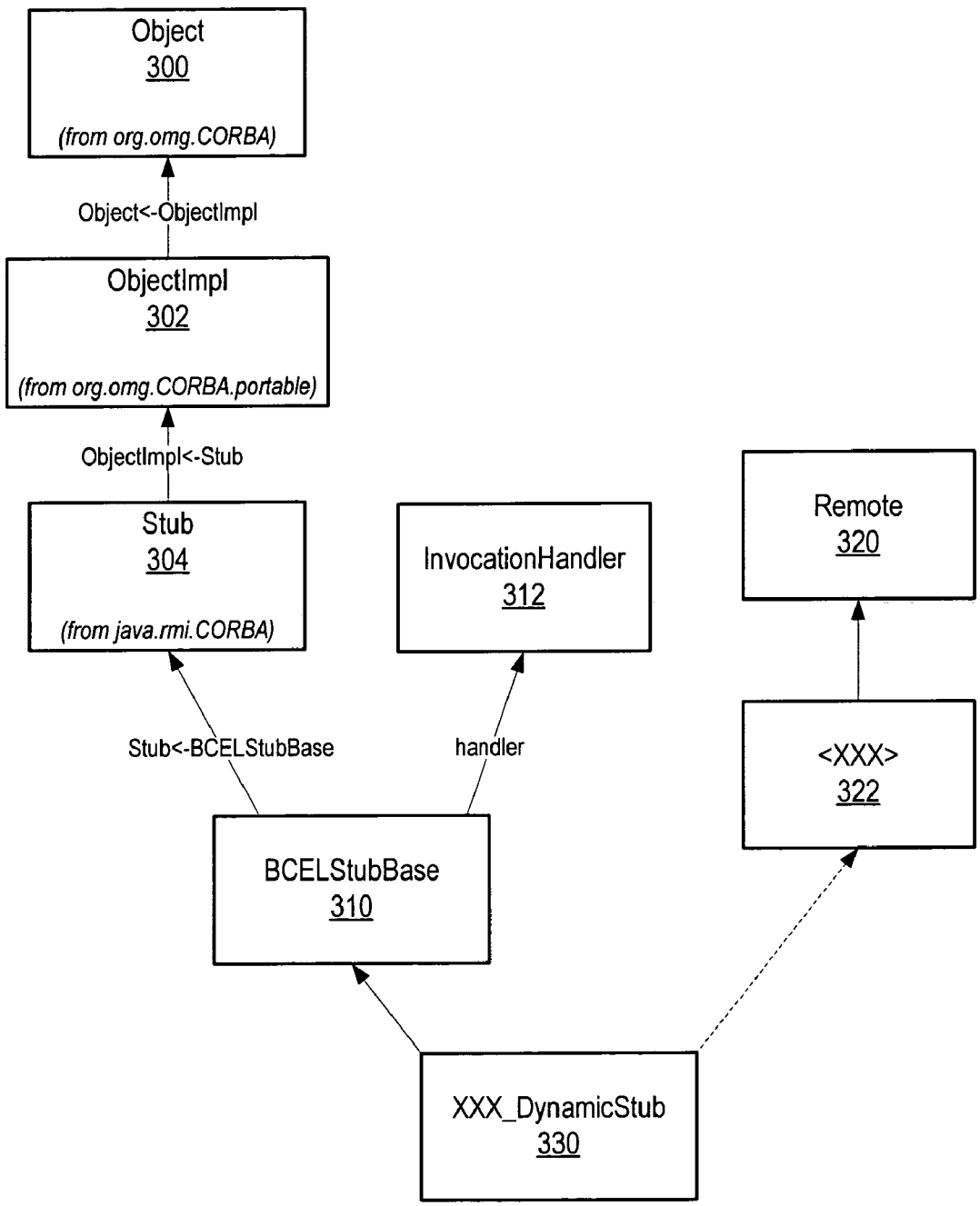
FIG. 9 illustrates an exemplary class architecture for dynamic Stubs dynamically generated using an external library such as BCEL according to one embodiment.

FIG. 4 is a block diagram illustrating the client side of an exemplary dynamic RMI-IIOP client-server implementation using an external library dynamic Stub mechanism to dynamically generate Stubs for a remote interface according to one embodiment. In one embodiment, Presentation Manager 216, which may be a component of the ORB architecture, may provide an interface that allows Stub-generating mechanisms, or Stub Factories, to be plugged in to support different types of Stub generation, which may include one or more dynamic Stub generation and static Stub loading mechanisms. In FIG. 4, an External Library Dynamic Stub Factory 224 configured to generate dynamic Stubs 234 for a remote interface at runtime according to remote interface information 240 is plugged into the Presentation Manager 216. FIG. 9 illustrates an exemplary class architecture for dynamic Stubs 234. Note that, in another embodiment, Presentation Manager 216 may be configured to always use an external library dynamic Stub mechanism to generate dynamic Stubs for remote interfaces.

Figure 5:
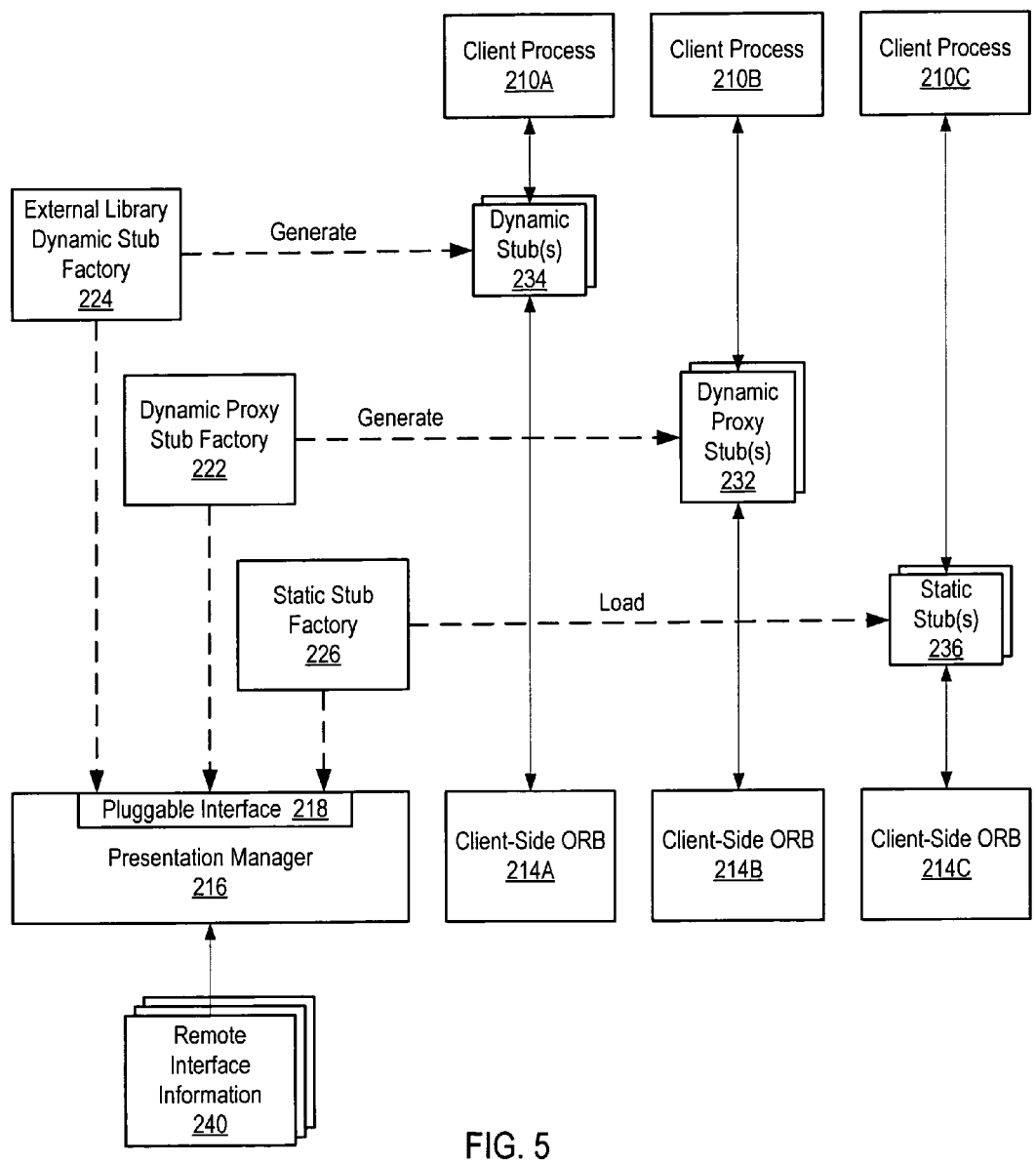
FIG. 5 is a block diagram illustrating the client side of an exemplary dynamic RMI-IIOP client-server implementation including multiple pluggable mechanisms for generating static and dynamic Stubs for remote interfaces according to one embodiment.

FIG. 5 is a block diagram illustrating the client side of an exemplary dynamic RMI-IIOP client-server implementation including multiple pluggable mechanisms for generating static and dynamic Stubs for remote interfaces according to one embodiment. In one embodiment, Presentation Manager 216, which may be a component of the ORB architecture, may provide an interface 218 that allows Stub-generating mechanisms, or Stub Factories, to be plugged in to support different types of Stub generation, which may include one or more dynamic Stub generation mechanisms and one or more static Stub loading mechanisms, to dynamically or statically generate Stubs for one or more client processes 210. In one embodiment, only one Stub Factory may be plugged in to the Presentation Manager 216 pluggable interface 218 at any one time.

Figure 7:
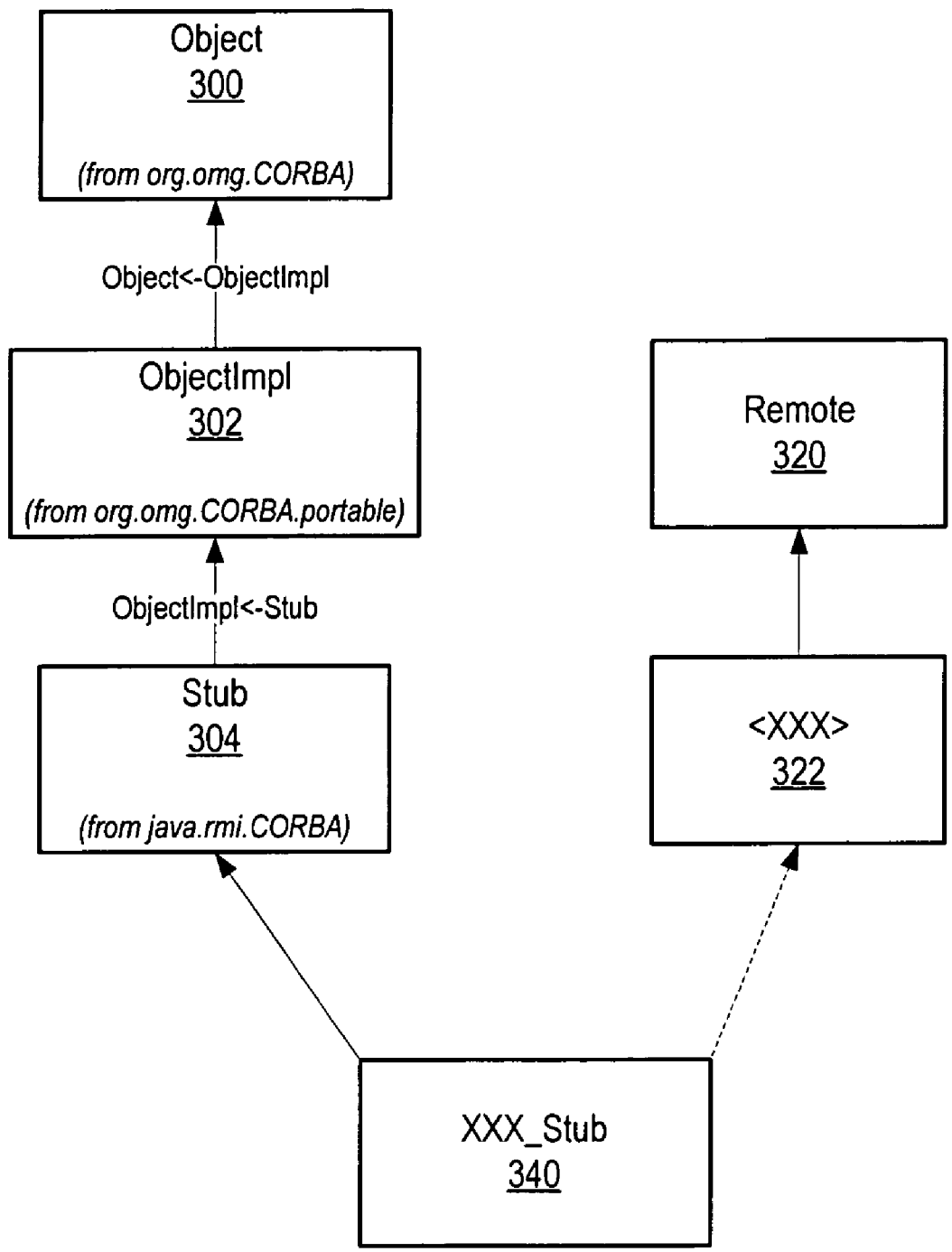
FIG. 7 illustrates an exemplary class architecture for static Stubs according to one embodiment.

In one embodiment, Stub Factories that may be plugged in to the Presentation Manager 216 may include an External Library Dynamic Stub Factory 224 configured to generate dynamic Stubs 234 for a remote interface at runtime according to remote interface information 240, a Dynamic Proxy Stub Factory 222 configured to generate dynamic proxy Stubs 232 for a remote interface at runtime according to remote interface information 240, and a static Stub factory 226 configured to load static Stubs 236 for a remote interface. The static Stub factory 226 may load static stubs 236, generated using RMIC-iiop, using the current ClassLoader. It may be necessary to support the loading of static Stubs 236, for example, to support IDL interfaces. FIG. 7 illustrates an exemplary class architecture for static Stubs 236. FIG. 8 illustrates an exemplary class architecture for dynamic proxy Stubs 232. FIG. 9 illustrates an exemplary class architecture for dynamic Stubs 234.

Stub Class Architecture

Figure 6:
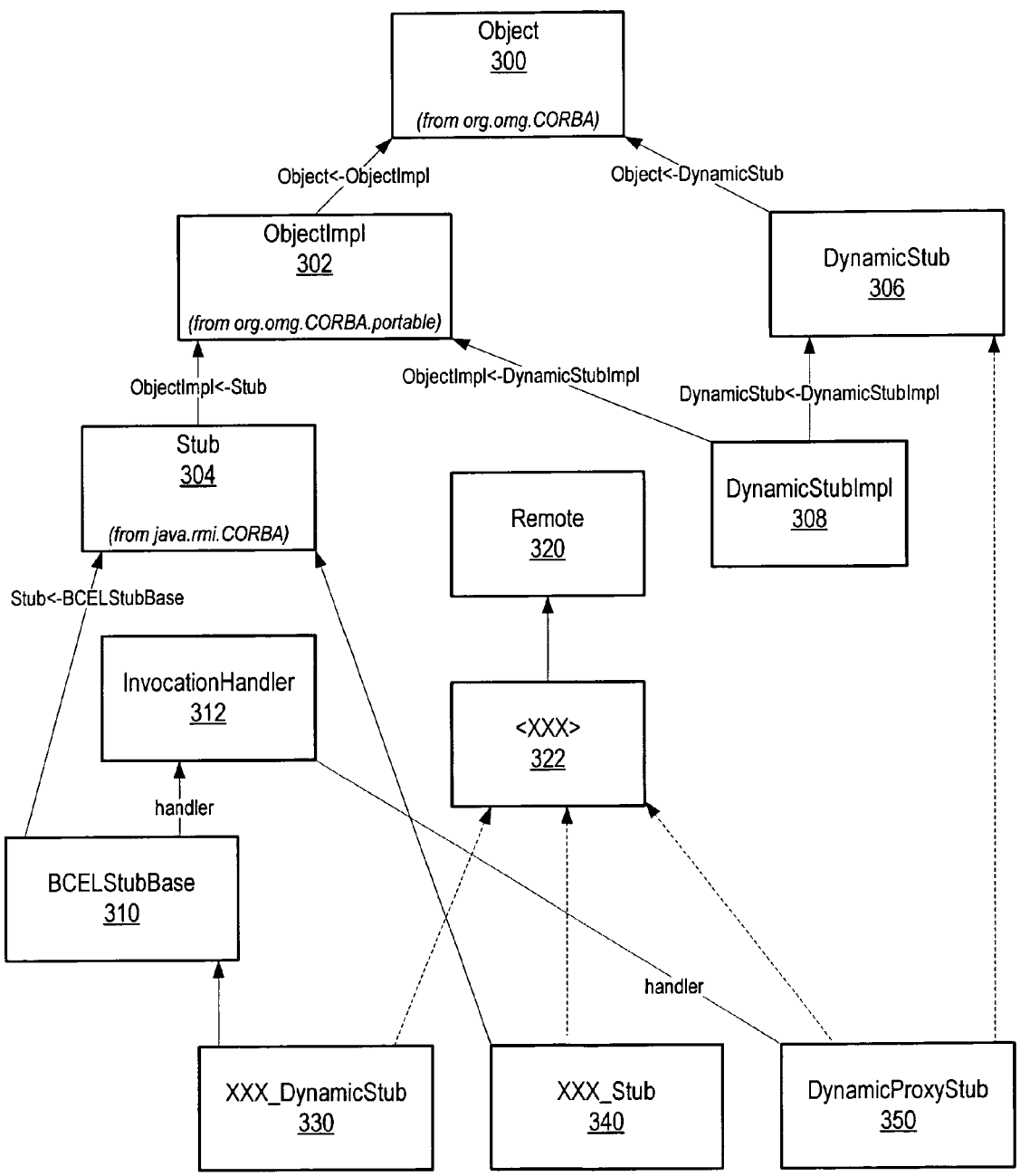
FIG. 6 illustrates an exemplary class architecture for static Stubs, dynamic Stubs generated using an external library such as BCEL, and dynamic proxy Stubs generated using a dynamic proxy mechanism according to one embodiment.

FIG. 6 illustrates an exemplary class architecture for static Stubs, dynamic Stubs generated using an external library such as BCEL, and dynamic proxy Stubs generated using a dynamic proxy mechanism according to one embodiment. In FIG. 6, Object 300, ObjectImpl 302, and Stub 304 are classes defined in the OMG standards and are thus "standard" CORBA, Object 300 and ObjectImpl 302 apply to both IDL and RMI-IIOP. These classes define the methods shared by all remote references. The org.omg.CORBA ObjectImpl class 302 provides an implementation of the org.omg.CORBA.Object by delegating to a delegate (not shown). Stub 304 class extends the ObjectImpl 302 class and is part of the RMI-IIOP specification. Remote 320 and InvocationHandler 312 are classes defined as part of Java. <XXX> 322 represents some remote interface for which the different types of Stubs may be implemented.

Three types of Stubs and their supporting classes are illustrated: static Stubs (XXX_Stub 340) as defined in the RMI-IIOP specification, Stubs and supporting classes for the dynamic proxy implementation (DynamicStub 306, DynamicStubImpl 308, and DynamicProxyStub 350), and the BCEL-based dynamic Stubs and their supporting classes (BCELStubBase 310 and XXX_DynamicStub 330). Each of these types of Stubs is described below.

For clarity, FIG. 7 illustrates an exemplary class architecture for static Stubs, and shows just the classes from FIG. 6 used to support static Stubs according to one embodiment. FIG. 8 illustrates an exemplary class architecture for dynamic proxy Stubs dynamically generated using the dynamic proxy mechanism and shows just the classes from FIG. 6 used to support dynamic proxy Stubs according to one embodiment. FIG. 9 illustrates an exemplary class architecture for dynamic Stubs dynamically generated using an external library such as BCEL and shows just the classes from FIG. 6 used to support dynamic Stubs according to one embodiment.

In one embodiment, the remote method invocation mechanism may share the same basic outline for both static Stubs and dynamic Stubs, as follows:

Determine the method name for the remote request. For static Stubs, the method name may be determined from the generated code. For dynamic Stubs, a method object may be obtained, and the corresponding operation name for that method may be looked up.

Obtain the delegate that represents the remote reference. For static Stubs and the two types of dynamic Stubs illustrated in FIG. 6, there is either an ObjectImpl 302 or a DynamicStubImpl 308 from which the delegate may be obtained.

Determine whether the request is local (i.e., the client and server are co-located).

If not local:

Use the delegate to create a request that is represented as an OutputStream.

Marshal the arguments to the OutputStream.

Tell the delegate to finish the invocation. Note that this does not necessarily imply that sending the request represented as an OutputStream "over the wire" is begun at this point. Sending the request may begin prior to this. Note that the client may "block" at this point until the server sends back a response.

Unmarshal the result. Note that the result may be a normal completion or an exception.

Inform the delegate that the call has completed (releaseReply). All results have been unmarshaled, so the delegate can release resources as needed.

Return the result.

Otherwise, this is a local (co-located) call:

Use the servant_preinvoke method on the delegate to obtain a ServantObject. A ServantObject is a wrapper around the actual servant that supports the remote interface. The servant is essentially the implementation of the remote interface for this object.

Copy the arguments if necessary to preserve the correct RMI-IIOP semantics. There may be different pluggable mechanisms for performing this, including one that does not copy arguments at all to run as fast as possible.

After all arguments are copied, do a normal Java invocation to invoke the method on the servant obtained from the ServantObject.

Handle the result. This may mean copying the result, if necessary, or throwing an exception if necessary.

Inform the delegate that the call has completed (servant_postinvoke).

Return the result.

Note that, for co-located calls, there is no transport; the calls go straight to the Servant, which is in the same address space as the calling process. For non-local calls, the calls go through the transport, which may require the overheads of transport such as TCP/IP and marshaling.

The above is an exemplary basic outline for an exemplary remote method invocation mechanism, excluding various exception cases. Most exceptions may simply be returned to the caller after being unmarshaled, much as an ordinary result, but the exceptions are thrown instead of returned from the method. In one embodiment, there may be a RemarshalException. If a RemarshalException is thrown, the Stub code goes back to the beginning and restarts the invocation process. This may be necessary to support the LocationForward mechanism defined in the GIOP protocol.

Static Stubs

FIG. 7 illustrates an exemplary class architecture for static Stubs, and shows just the classes from FIG. 6 used to support static Stubs according to one embodiment. Classes with names similar to XXX_Stub 340 may be generated by RMIC-iiop. These classes extend the javax.rmi.CORBA.Stub class (Stub 304) as required by the RMI-IIOP specification, and implement the remote interface (e.g., <XXX> 322). While static Stubs 340 may be generated in other ways and using other mechanisms, the static Stubs generated by RMIC-iiop may duplicate the complete method invocation logic in each method.

In one embodiment, the general invoke logic may all be generated in place for each method. In this embodiment, each method may be customized for the exact types of arguments, result, and exceptions thrown by the method. However, given the optimizing capabilities of Virtual Machines (VMs) that may use aggressive in-lining at runtime, other embodiments may use other mechanisms to generate the invoke logic.

Dynamic Stubs

In one embodiment, the invocation logic for both kinds of dynamic Stubs (in FIG. 6, dynamic Stubs 330 generated through an external library mechanism and dynamic proxy Stubs 350) may be the same, since, in both cases, the same InvocationHandler 312 may be used to handle the methods on the remote interface (e.g., <XXX> 322). This code, which may be in a class StubInvocationHandlerImpl, may operate as follows:

The method name for the remote request is obtained from the IDLNameTranslator in a reversal of the mechanism used in Ties.

All marshaling, unmarshaling, and copying of arguments and results is handled by a DynamicMethodMarshaler In the co-located invocation case, the invocation may be handled using reflection.

In one embodiment, the main differences between the two types of dynamic Stubs may be in how the dynamic Stubs are constructed, and in how the non-remote interface methods are handled. Note that, in embodiments, the dynamic Stub generation mechanisms described herein may be pluggable. Thus, in one embodiment, a dynamic RMI-IIOP implementation may support one or the other of the dynamic Stub generation mechanisms described herein through a plug-in interface. In one embodiment, both dynamic Stub generation mechanisms may be supported simultaneously as alternatives.

The RMI-IIOP and J2EE specifications require that remote and co-located invocations behave the same way as much as possible. The RMI-IIOP specification requires that, if the client and server are co-located in the same process or address space (e.g., both located on the same VM), they must behave with the same semantics as if they were not co-located (e.g., each located on a different VM). In particular, if one thread in a client sends an object to a server, and another thread in the client modifies that object, none of these changes should be visible to the server. This happens automatically in the remote case, but the co-located case conventionally calls to Util.copyObject or Util.copyObjects to copy arguments, results, and exceptions. Thus, if a complex data type is passed from the client to the server across a co-located call, the server should receive a copy of the argument instead of a reference to the argument. The client may send an argument to the server and continue to modify its local copy after the call. On a non-co-located call, that modification would not be observable to the server. On a co-located call, that modification should also not be observable to the server. That requires a copy of the argument to be passed rather than a reference to the argument. Details about how arguments are represented reflectively and the argument copying mechanism should not interact to negatively affect the performance of the argument copying mechanism.

Embodiments of dynamic RMI-IIOP may provide an argument copying mechanism that does not negatively affect the performance of optimized argument copying. The performance of the co-located invocation case may be important for some applications of the application server. One aspect of this cost is the overhead of copying arguments and results. In one embodiment, this may be optimized in the application server using a complex reflective copier, but even calling the copier for simple data types may be expensive. This is not a problem in the static Stub mechanism, since the generated code only calls the copier for non-primitive types. In dynamic Stub mechanisms, all arguments are objects of some type. Primitives may be wrapped in the java.lang wrappers of the appropriate type. If the arguments (or result) are primitive Java types (such as boolean, byte, short, character, int, long, float, or double) there is no need to perform a copy. However, there may be no way to tell inside a call, for example, whether an Integer is an int (which cannot be aliased, and so need not be copied), or an Integer (which must be copied in order to preserve aliasing). In one embodiment, a DynamicMethodMarshaller class may include methods that tell the Stub's invocation handler whether a copy of an argument is required or not. In one embodiment, the DynamicMethodMarshaler may be constructed with complete type information on the Method, so it may be able to tell whether copying is required. Consequently, the StubInvocationHandler may delegate the decision as to whether to invoke the current copier to the DynamicMethodMarshaler, which analyzes the Method argument types. If the arguments are all primitives, the DynamicMethodMarshaler copy method does nothing; otherwise, it calls the copier.

Dynamic Proxy Stubs

FIG. 8 illustrates an exemplary class architecture for dynamic proxy Stubs dynamically generated using the dynamic proxy mechanism and shows just the classes from FIG. 6 used to support dynamic proxy Stubs according to one embodiment. For dynamic proxy Stubs 350, at least some of the methods defined in ObjectImpl 302 and in Stub 304 may be duplicated in DynamicStub 306 so that these standard methods are available in the dynamic proxy Stub 350.

A class (instead of an interface) is used as the standard interface for all Stubs in the RMI-IIOP specification. In RMI-IIOP implementations, a client may obtain a Stub and directly handle it as a javax.rmi.CORBA.Stub class. This may also occur in the client-side ORB itself. In one embodiment, to provide support for dynamic proxy Stubs in these situations, a "Stub Adapter" SPI may be provided. An exemplary Stub adapter class may include one or more of, but is not limited to, the following methods, which may be static methods:

boolean isStubClass(Class)
boolean isStub(Object)
void setDelegate(Object, Delegate)
Delegate getDelegate(Object)
org.omg.CORBA.Object activateServant(Servant)
org.omg.CORBA.Object activateTie(Tie)
ORB getORB(Object)
String[ ] getTypeIds(Object)
void connect(Object, ORB)
boolean isLocal(Object)
OutputStream request(Object, String, boolean)

In one embodiment, these methods may be implemented by checking two cases: either the Object is a java.rmi.CORBA.Stub (Stub 304 from FIG. 6), in which case the Object is cast to Stub, or else the Object is a DynamicStub 306, in which case the Object is cast to DynamicStub.

In one embodiment, a dynamic proxy Stub (DynamicProxyStub 350) may include, but is not limited to, a dynamic proxy that implements the remote interface (e.g., <XXX> 322) and DynamicStub 306, and an InvocationHandler 312. The dynamic proxy may be created using the standard JDK proxy mechanism. The invocation handler may be a composite InvocationHandler that may include, but is not limited to, one part that delegates methods to DynamicStubImpl 308, and another part that handles invocations on the methods of the remote interface as previously described.

Dynamic External Library (BCEL) Stubs

FIG. 9 illustrates an exemplary class architecture for dynamic Stubs dynamically generated using an external library such as BCEL and shows just the classes from FIG. 6 used to support dynamic Stubs according to one embodiment. One embodiment may provide a lightweight proxy mechanism that is at least partly independent of the RMI-IIOP Stub requirements. A Stub is in essence a proxy, and so most or all of the mechanisms that are part of the RMI-IIOP invocation process may be placed in a shared class.

One embodiment may provide a proxy generator. An exemplary interface for a proxy generator may include, but is not limited to, the following:

public class ProxyCreator extends CodeGeneratorBase implements Constants {
    public ProxyCreator(String className, String superClassName, Class[ ] interfaces,
        Method[ ] methods);
}
public abstract class CodeGeneratorBase {
    public Class create(ProtectionDomain pd, ClassLoader loader);
}

In one embodiment, in using the above classes:
superClass has an accessible no-args constructor
superclass has an accessible method with the following signature:
Object invoke(int methodNumber, Object[ ] args);
The methods passed into the ProxyCreator constructor are made available through some mechanism at runtime so that an invoke method in the superClass sees the same methods as were used to construct the proxy.

In the exemplary BCEL dynamic Stub implementation illustrated in FIG. 9, the superClass is BCELStubBase 310. An interface for this class may include, but is not limited to, the following:

public abstract class BCELStubBase extend javax.rmi.CORBA.Stub {
    public String[ ]_ids( );
    public void initialize(String[ ] typeIds, InvocationHandler handler,
        Methods[ ] methods);
    protected Object invoke(int methodNumber, Object[ ] args) throws Throwable
    {
        Method method = methods[methodNumber];
        return handler.invoke(null, method, args);
    }
}

In one embodiment, the _ids( ) method may be required because it is an abstract method in javax.rmi.CORBA.Stub. The _ids( ) method may be implemented by returning the value of the typeIds argument that was passed into the initialize method. The initialize method may store its arguments in private fields in BCELStubBase 310. The invoke method obtains the appropriate java.lang.reflect.Method from the methods passed into the initialize method, and then passes this method and the args to the handler that was passed into the initialize method.

In one embodiment, BCELStubBase 310 may include an initialize( ) method that acquires an array of methods. This array of methods may be used to determine which method corresponds to a particular operation. From that array of methods, a small method for each of the methods may be generated that handles the primitive and non-primitive argument types, together with the hard code in the generated byte code index (0–(length of methods–1)), so that, to get the correct method at runtime, an index into the array of methods may be performed instead of performing a table lookup based on more complex keys (such as the method name and argument types), which tends to be more expensive than indexing an array in terms of time.

An alternative to the array indexing method described above is to create a series of private static final data members in the generated class that are initialized to the required java.lang.reflect.Method objects. Each method generated by ProxyCreator may then refer to the appropriate static data member to get the required Method object.

In one embodiment, in the code generated by the proxy generator, for the method at index n of methods[ ], the generated code:

- Creates an Object[ ] args sized to hold the arguments.
- Wraps args of primitive type in the appropriate wrapper (e.g., java.lang.Integer for an int)
- Copies the argument or argument wrapper into the args array.
- Calls invoke(n, args) in the superClass.
- Unwraps the result if it is a primitive and then returns the result.

In one embodiment, the invocation handler used here is the StubInvocationHandlerImpl previously described. There is no need for a complex (and slower) InvocationHandler 312. The superclasses directly handle the non-remote interface methods that are required for a Stub.

Stub Serialization

All RMI-IIOP Stubs are required to be serializable. The serialized form is specified by the RMI-IIOP specification, and is the Interoperable Object Reference IOR written out to a Java OutputStream in the same way that an IOR is written to a Common Data Representation (CDR) stream. In the static Stub mechanism, the javax.rmi.CORBA.Stub class implements readObject and writeObject methods that operate by delegating to the StubDelegate. The StubDelegateImpl class then simply reads and writes the IOR representation used for the Stub.

The static Stub mechanism may assume the ClassLoader can always get the Stub. This even handles downloadable Stubs, since the ORB uses the RMIClassLoader to load Stub classes. In embodiments of dynamic RMI-IIOP as described herein, for dynamic Stubs, the ClassLoader is not relied on to directly load the correct Stub class, so that the dynamic RMI-IIOP implementation may remain independent of the application server ClassLoader usage.

For the dynamic proxy Stub mechanism, in one embodiment, DynamicStubImpl 308 may implement readObject, writeObject, and readResolve methods. The readObject and writeObject methods may be the same as in the StubDelegateImpl code used in the static Stub mechanism. However, dynamic proxy Stubs may have additional states as compared to static Stubs, due to the need for information such as the DynamicMethodMarshaler and IDLNameTranslator. For dynamic proxy Stubs, one type is written out to the stream (the dynamic proxy itself); when read back, a different type needs to be generated (the Stub type). Consequently, in one embodiment, the DynamicStubImpl 308 may also include a "readResolve" method. In one embodiment, a readResolve method may operate as follows:

- Get the repository ID from the IOR. The repository ID that is part of every IOR defines the type of that remote interface. The entire class definition is not written; instead, the name of the class is written, and the class is loaded by some other mechanism.
- Get the interface class name from the repository ID
- Use the JDKBridge to load the interface class (which must be in the local VM)
- Use the Presentation Manager to get the class data, which contains the IDLNameTranslator among other things
- Use the class data to create an InvocationHandlerFactoryImpl
- Use the InvocationHandlerFactoryImpl to create the InvocationHandler that is returned.

In one embodiment, when a dynamic proxy Stub 350 is serialized, the dynamic proxy itself is serialized. Dynamic proxies may be serialized as a proxy descriptor plus the state of the proxy, which is just the InvocationHandler 312. In one embodiment, the InvocationHandler 312 may be a private class, which may be called, for example, "CustomCompositeInvocationHandlerImpl", and which may be a nested class in the InvocationHandlerFactoryImpl class. CustomCompositeInvocationHandlerImpl may define a writeReplace method that returns the DynamicStubImpl 308.

In one embodiment, when a dynamic proxy Stub 350 is deserialized, a DynamicStubImpl 308 is constructed, and then its readObject method is called, which restores the IOR. Next, the readResolve method may be called, which creates the correct CustomCompositeInvocationHandlerImpl. Finally, a proxy class is constructed which has the CustomCompositeInvocationHandlerImpl as its InvocationHandler.

For the dynamic Stub mechanism using an external library such as BCEL to construct dynamic Stubs (e.g., XXX_DynamicStub 330), in one embodiment, the state for the Stub may be contained in the BCELStubBase 310 class. Since this class inherits from javax.rmi.CORBA.Stub (Stub 304), Stub 304 serializes and deserializes the IOR. BCELStubBase 310 may include transient fields, and the generated Stub 330 may include no data, so the only state actually serialized in this case may be the IOR. However, as in the dynamic proxy mechanism, the transient state of BCELStubBase 310 is restored on deserialization, and therefore BCELStubBase 310 may define a readObject method for this purpose. This readObject method may be similar to the DynamicStubImpl.readResolve method, but may construct a StubInvocationHandlerImpl instead of using the InvocationHandlerFactoryImpl.

The BCEL dynamic Stub mechanism may also need to insure that the BCEL-generated class is available. In one embodiment, this may be handled by adding a writeReplace method in the generated BCEL Stub class 330 that calls a superClass method that writes a BCELStubBase 310 instead of the generated BCEL Stub class 330. Correspondingly, a readResolve method in the BCELStubBase 310 may generate the BCEL Stub class 330, create an instance of this class, call the initialize method on the new instance, and return the result.

Presentation Manager Configuration

In one embodiment, most of the configuration for the ORB may be handled in the ORBImpl class when the ORB is created. However, the Presentation Manager may be needed in the RMI-IIOP implementation, so may not be able to be handled in the ORBImpl class when the ORB is created. Much of the RMI-IIOP code runs when no ORB is available, and so the basic StubFactory mechanisms may need to be available even when there is no ORB. Consequently, in one embodiment, the Presentation Manager may be configured statically in the ORB SPI class. That is, the Presentation Manager may be a singleton, and may be shared by all ORBs, at least within the same ClassLoader.

In one embodiment, system properties that may be used to configure the Presentation Manager in a static initializer in the ORB SPI class may include, but are not limited to:

- A "UseDynamicStub" flag, which may be a Boolean. This flag indicates that dynamic (if true) or static (if false) Stubs are to be used for all RMI-IIOP Stubs. IDL Stubs are static in either case.
- A "DynamicStubFactoryFactoryClass" field, which is a String representing a Class name. This value (if set) indicates that a special StubFactoryFactory is to be used. In one embodiment, if this property is not set to a valid StubFactoryFactory class, the dynamic proxy Stub mechanism may be used as the default. This allows the placement of the BCEL-based StubFactoryFactory in an optional part of the ORB.

In embodiments of dynamic RMI-IIOP, depending on how the ORB is set up, the ORB may automatically perform various actions during configurations. In one embodiment, the ORB may be delivered to the application server in two parts: an ORB Jar and an optional components Jar. If the ORB Jar is present but the optional components Jar is not present in the application server, the BCEL-based dynamic StubFactoryFactory is not present and thus is not loaded, so the dynamic proxy Stub mechanism is used as the default if the UseDynamicStub flag indicates that dynamic stubs are to be used. The default value for the flag may depend on another aspect of the ORB, the namespace in which the ORB is built. This allows the ORB and Presentation Manager configuration to be set up in default configurations as needed to support the various environments the ORB may run in, while maintaining the ability to override the default configuration to use the dynamic stub mechanisms.

Figure 10:
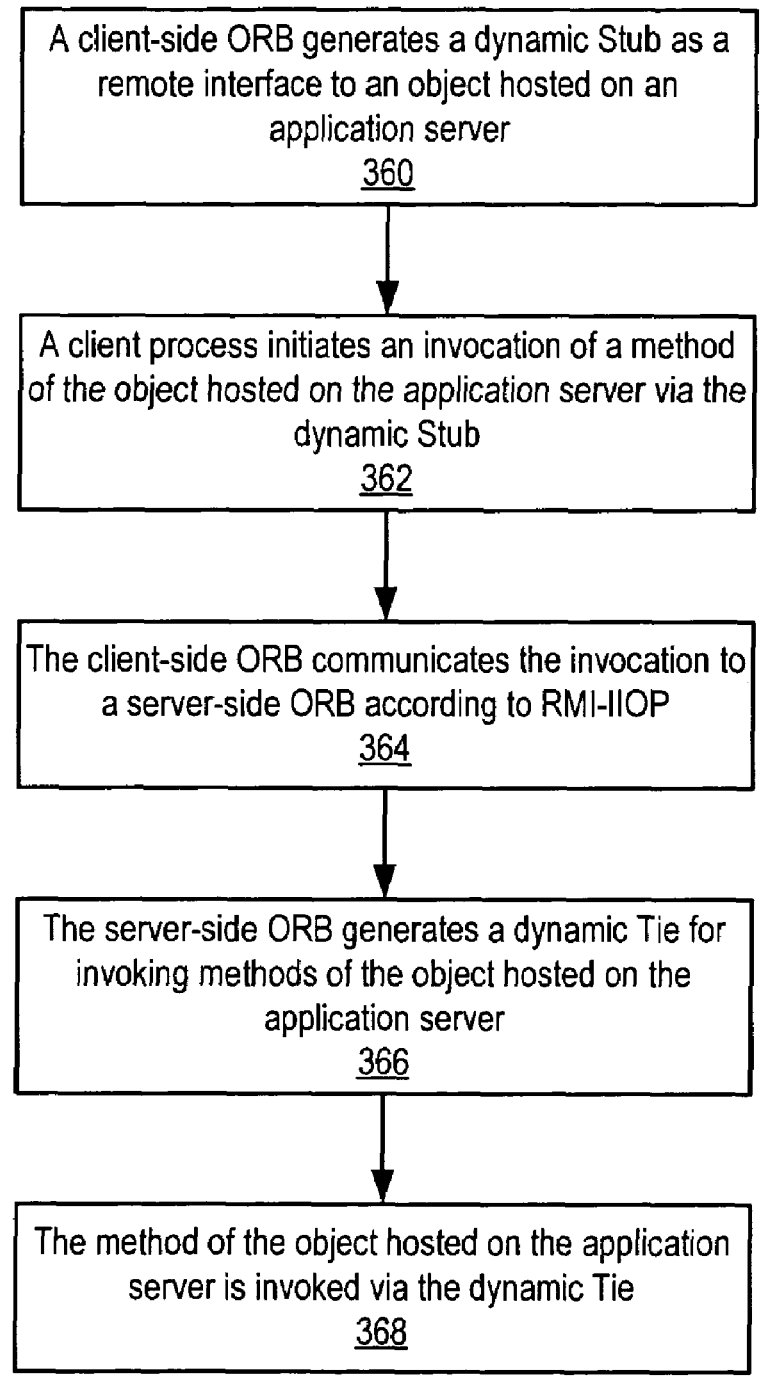
FIG. 10 is a flowchart of a method of implementing dynamic RMI-IIOP according to one embodiment.

FIG. 10 is a flowchart of a method of implementing dynamic RMI-IIOP according to one embodiment. As indicated at 360, a client-side ORB may generate, at runtime, a dynamic Stub as a remote interface to an object (e.g., an EJB) hosted on an application server. The client and the application server may be co-located in the same address space (e.g., Virtual Machine), or alternatively may be located on different address spaces (e.g., Virtual Machines). In one embodiment, dynamic Stubs may be generated on an "as needed" basis, i.e. a dynamic Stub may be generated only when a client process needs to invoke a remote object hosted by an application server, as opposed to statically generating Stubs "up front" as in conventional RMI-IIOP implementations.

Embodiments may provide one or more mechanisms for generating dynamic Stubs and ties. One embodiment may provide a dynamic proxy mechanism for dynamically generating Stubs (dynamic proxy Stubs) at runtime, as illustrated in FIG. 3. FIG. 8 illustrates an exemplary class architecture for dynamic proxy Stubs. One embodiment may provide an external library mechanism for dynamically generating Stubs at runtime, as illustrated in FIG. 4. FIG. 9 illustrates an exemplary class architecture for dynamic Stubs. In one embodiment, the external library mechanism may leverage the Byte Code Engineering Library (BCEL) to generate dynamic Stubs. In one embodiment, the client-side ORB may include a pluggable interface for accepting one of two or more different dynamic Stub generation mechanisms, such as a dynamic Proxy mechanism and an external library mechanism, to generate dynamic Stubs at runtime, as illustrated in FIG. 5. Note that, in one embodiment, the client-side ORB may be configured to load static Stubs as remote interfaces to objects hosted on application servers for client processes that do not support the generation of dynamic Stubs at runtime.

As indicated at 362, after the dynamic Stub is generated, a client process may initiate an invocation of a method of the object hosted on the application server via the dynamic Stub. As indicated at 364, the client-side ORB may communicate the invocation to a server-side ORB in accordance with RMI-IIOP. As indicated at 366, the server-side ORB may generate, at runtime, a dynamic Tie for invoking methods of the object hosted on the application server. In one embodiment, the server-side ORB may generate the dynamic Tie in response to the invocation on the object received from the server-side ORB. Alternatively, the dynamic Tie may be generated prior to receiving the invocation from the client-side ORB. In one embodiment, the server-side ORB may generate the dynamic Tie using reflection, as previously described. The method of the object hosted on the application server may then be invoked via the dynamic Tie, as indicated at 368.

Figure 11:
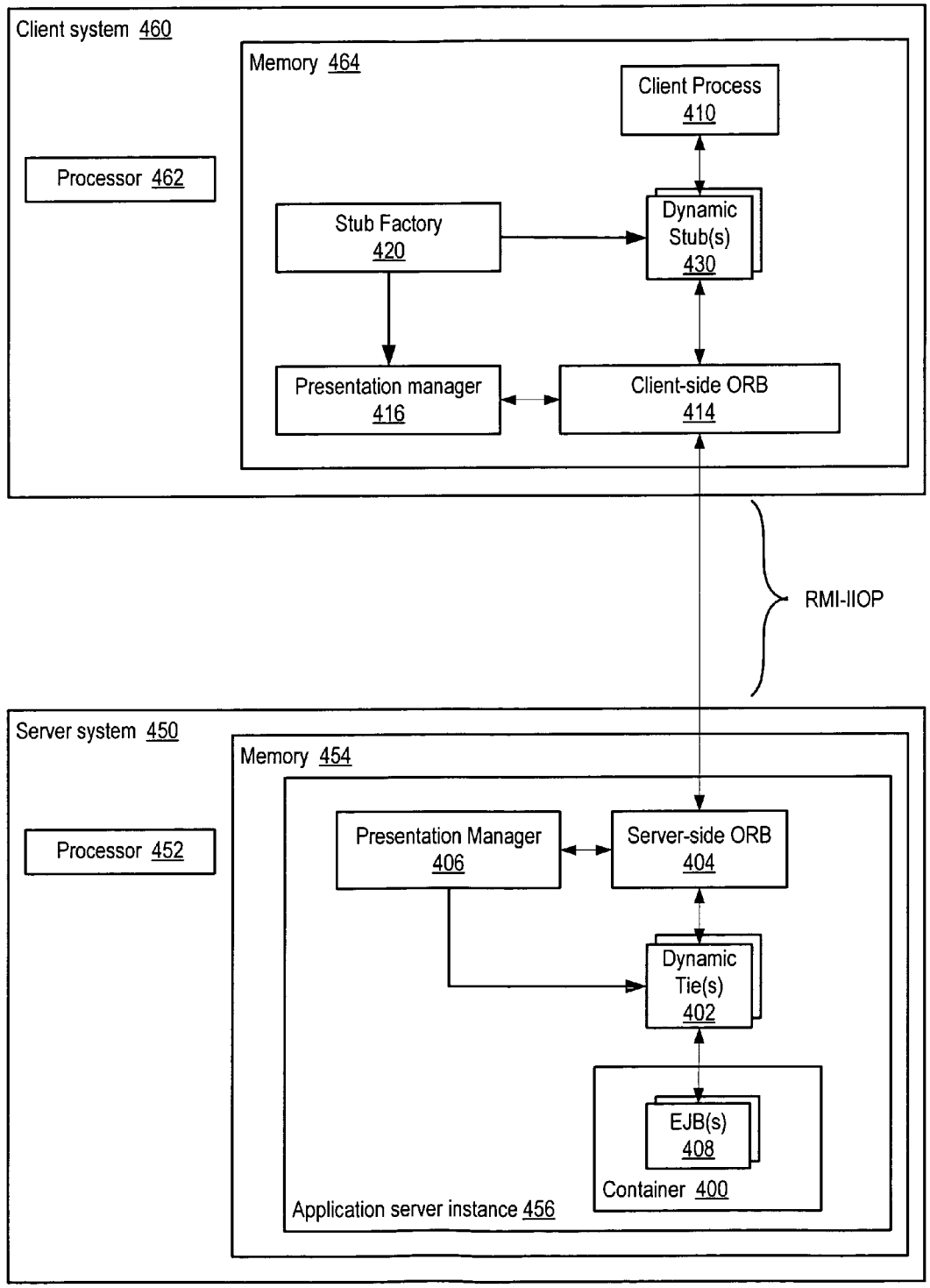
FIG. 11 illustrates a client system and a server system implementing dynamic RMI-IIOP with dynamic Stubs and Ties according to one embodiment.

FIG. 11 illustrates a client system and a server system implementing dynamic RMI-IIOP with dynamic Stubs and Ties according to one embodiment. Client system 460 may be any of various types of devices, including, but not limited to, a personal computer system, desktop computer, laptop or notebook computer, mainframe computer system, workstation, network computer, Portable Digital Assistant (PDA), smart phone, or other suitable device. Client system 460 may include at least one processor 462. The processor 462 may be coupled to a memory 464. Memory 464 is representative of various types of possible memory media, also referred to as "computer readable media" or "computer-accessible media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

Client system 460 may couple over a network, via wired or wireless network connections, to one or more server systems, such as server system 450, each hosting one or more application server instances 456. Client system 460 may communicate with application server instance 456 on server system 450 to invoke objects such as EJBs 408 hosted on application server instance 456 using an embodiment of dynamic RMI-IIOP as described herein. The network may be, for example, a Local Area Network (LAN), a Wide Area Network (WAN), a Storage Area Network (SAN), a LAN with Network-Attached Storage (NAS), or any network capable of coupling client systems to server systems. Server system 450 may be any of various types of devices including, but not limited to, workstations, server computers, personal computer systems, desktop computers, laptop or notebook computers, mainframe computer systems, workstations, network computers, or any device suitable for hosting an application server instance 456. Note that various operating systems and versions of operating systems may be supported by server system 450 in embodiments. Server system 450 may include at least one processor 452. The processor 452 may be coupled to a memory 454. Memory 454 is representative of various types of possible memory media, also referred to as "computer readable media" or "computer-accessible media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

Client system 460 may include, in memory 464, one or more client-side ORB 414 instances and a Presentation Manager 416 instance, which may be part of the ORB architecture, as described herein. Server system 450 may include, in memory, one or more application server instances 456. An application server instance 456 may include one or more server-side ORB 404 instances and a Presentation Manager 406 instance, which may be part of the ORB architecture, as described herein, and one or more objects such as EJBs 408 in one or more containers 400.

In embodiments, rather than generating and loading static Stubs and Ties as in conventional RMI-IIOP implementations, the implementation of dynamic RMI-IIOP may dynamically generate Stubs and Ties at runtime. At runtime, Presentation Manager 406 on server system 450 may generate dynamic Ties 402 for remote interfaces to EJBs 408 as needed. In one embodiment, reflection may be used to generate dynamic Ties 402, as described herein. On client system 460, Presentation Manager 416 may generate dynamic Stubs 430 as remote interfaces to EJBs 408 for client process 410 at runtime as needed. In one embodiment, Presentation Manager 416 may provide an interface whereby one or more Stub Factories 420 may be plugged in to generate dynamic Stubs 430 at runtime according to one or more dynamic Stub mechanisms, which may include, but are not limited to, a dynamic proxy mechanism and an external library mechanism as described herein. Note that some embodiments may provide a mechanism for statically generating Stubs when necessary or desired.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A dynamic Remote Method Invocation-Internet Inter-ORB Protocol (RMI-IIOP) system, comprising:
    an application server configured to host one or more objects;
    a server-side Object Request Broker (ORB) configured to generate at runtime a dynamic Tie for invoking an object hosted on the application server; and
    a client of the application server, comprising:
        a client process; and
        a client-side ORB configured to:
            generate at runtime a dynamic Stub as a remote interface to the object hosted on the application server for the client process; and
            communicate invocations on the dynamic Stub by the client process to the server-side ORB according to RMI-IIOP.

2. The dynamic RMI-IIOP system as recited in claim 1, wherein the server-side ORB is further configured to generate the dynamic Tie at runtime according to a Reflection mechanism.

3. The dynamic RMI-IIOP system as recited in claim 1, wherein the client-side ORB is further configured to generate the dynamic Stub at runtime according to a dynamic Proxy mechanism.

4. The dynamic RMI-IIOP system as recited in claim 1, wherein the client-side ORB is further configured to generate the dynamic Stub at runtime according to an external library mechanism.

5. The dynamic RMI-IIOP system as recited in claim 4, wherein the external library is a Byte Code Engineering Library (BCEL).

6. The dynamic RMI-IIOP system as recited in claim 1, wherein the client-side ORB comprises a pluggable interface configured to accept one of two or more different dynamic Stub generation mechanisms configured to generate dynamic Stubs at runtime.

7. The dynamic RMI-IIOP system as recited in claim 6, wherein the dynamic Stub generation mechanisms include a dynamic Proxy mechanism and an external library mechanism.

8. The dynamic RMI-IIOP system as recited in claim 1, wherein the object is an Enterprise JavaBean (EJB).

9. The dynamic RMI-IIOP system as recited in claim 1, wherein the client-side ORB is further configured to load statically generated Stubs as remote interfaces to the objects hosted on the application server for client processes that do not support the generation of dynamic Stubs at runtime.

10. The dynamic RMI-IIOP system as recited in claim 1, wherein the client and the application server are co-located in the same Virtual Machine.

11. The dynamic RMI-IIOP system as recited in claim 1, wherein the client and the application server are located on different Virtual Machines.

12. A system, comprising:
    a processor; and
    a memory comprising program instructions, wherein the program instructions are executable by the processor to implement an Object Request Broker (ORB) configured to:
        generate at runtime a dynamic Tie for invoking an object hosted on an application server instance on the system;
        receive invocations on the object from a client-side ORB according to Remote Method Invocation-Internet Inter-ORB Protocol (RMI-IIOP), wherein the invocations are initiated by a client process via a dynamic Stub generated at runtime by the client-side ORB as a remote interface to the object hosted on the application server instance.

13. The system as recited in claim 12, wherein the server-side ORB is further configured to generate the dynamic Tie at runtime according to a Reflection mechanism.

14. The system as recited in claim 12, wherein the client-side ORB comprises a pluggable interface configured to accept one of two or more different dynamic Stub generation mechanisms configured to generate dynamic Stubs at runtime, wherein the dynamic Stub generation mechanisms include a dynamic Proxy mechanism and an external library mechanism.

15. The system as recited in claim 12, wherein the object is an Enterprise JavaBean (EJB).

16. The system as recited in claim 12, wherein the client process and the application server instance are co-located in the same Virtual Machine.

17. The system as recited in claim 12, wherein the client process and the application server instance are located on different Virtual Machines.

18. A system, comprising:
   a processor; and
   a memory comprising program instructions, wherein the program instructions are executable by the processor to implement an Object Request Broker (ORB) configured to:
      generate at runtime a dynamic Stub as a remote interface to an object hosted on an application server for a client process on the system; and
      communicate invocations on the dynamic Stub by the client process to a server-side ORB according to Remote Method Invocation-Internet Inter-ORB Protocol (RMI-IIOP).

19. The system as recited in claim 18, wherein the server-side ORB is configured to generate a dynamic Tie at runtime according to a Reflection mechanism.

20. The system as recited in claim 18, wherein the client-side ORB is further configured to generate the dynamic Stub at runtime according to a dynamic Proxy mechanism.

21. The system as recited in claim 18, wherein the client-side ORB is further configured to generate the dynamic Stub at runtime according to an external library mechanism.

22. The system as recited in claim 21, wherein the external library is a Byte Code Engineering Library (BCEL).

23. The system as recited in claim 18, wherein the client-side ORB comprises a pluggable interface configured to accept one of two or more different dynamic Stub generation mechanisms configured to generate dynamic Stubs at runtime.

24. The system as recited in claim 23, wherein the dynamic Stub generation mechanisms include a dynamic Proxy mechanism and an external library mechanism.

25. The system as recited in claim 18, wherein the object is an Enterprise JavaBean (EJB).

26. The system as recited in claim 18, wherein the client-side ORB is further configured to load statically generated Stubs as remote interfaces to the objects hosted on the application server for client processes that do not support the generation of dynamic Stubs at runtime.

27. The system as recited in claim 18, wherein the client process and the application server are co-located in the same Virtual Machine.

28. The system as recited in claim 18, wherein the client process and the application server are located on different Virtual Machines.

29. A method, comprising:
   a client-side Object Request Broker (ORB) generating at runtime a dynamic Stub as a remote interface to an object hosted on an application server for a client process;
   the client process initiating an invocation of a method of the object hosted on the application server via the dynamic Stub;
   the client-side ORB communicating the invocation to a server-side ORB according to Remote Method Invocation-Internet Inter-ORB Protocol (RMI-IIOP);
   the server-side ORB generating at runtime a dynamic Tie for invoking methods of the object hosted on the application server; and
   invoking the method of the object hosted on the application server via the dynamic Tie.

30. The method as recited in claim 29, further comprising the server-side ORB generating the dynamic Tie according to a Reflection mechanism.

31. The method as recited in claim 29, further comprising the client-side ORB generating the dynamic Stub according to a dynamic Proxy mechanism.

32. The method as recited in claim 29, further comprising the client-side ORB generating the dynamic Stub at runtime according to an external library mechanism.

33. The method as recited in claim 32, wherein the external library is a Byte Code Engineering Library (BCEL).

34. The method as recited in claim 29, wherein the client-side ORB comprises a pluggable interface configured to accept one of two or more different dynamic Stub generation mechanisms configured to generate dynamic Stubs at runtime, and wherein the method further comprises plugging in one of the dynamic Stub generation mechanisms to generate the dynamic Stub.

35. The method as recited in claim 34, wherein the dynamic Stub generation mechanisms include a dynamic Proxy mechanism and an external library mechanism.

36. The method as recited in claim 29, wherein the object is an Enterprise JavaBean (EJB).

37. The method as recited in claim 29, further comprising the client-side ORB loading one or more statically generated Stubs as remote interfaces to one or more objects hosted on the application server for client processes that do not support the generation of dynamic Stubs at runtime.

38. The method as recited in claim 29, wherein the client and the application server are co-located in the same Virtual Machine.

39. The method as recited in claim 29, wherein the client and the application server are located on different Virtual Machines.

40. A computer-accessible storage medium storing program instructions, wherein the program instructions are configured to implement:
   a client-side Object Request Broker (ORB) generating at runtime a dynamic Stub as a remote interface to an object hosted on an application server for a client process;
   the client-side ORB communicating an invocation of a method of the object hosted on the application server to a server-side ORB according to Remote Method Invocation-Internet Inter-ORB Protocol (RMI-IIOP), wherein the invocation is initiated by the client process via the dynamic Stub;
   the server-side ORB generating at runtime a dynamic Tie for invoking methods of the object hosted on the application server; and
   invoking the method of the object hosted on the application server via the dynamic Tie.

41. The computer-accessible medium as recited in claim 40, wherein the program instructions are further configured to implement the server-side ORB generating the dynamic Tie according to a Reflection mechanism.

42. The computer-accessible medium as recited in claim 40, wherein the program instructions are further configured to implement the client-side ORB generating the dynamic Stub according to a dynamic Proxy mechanism.

43. The computer-accessible medium as recited in claim 40, wherein the program instructions are further configured to implement the client-side ORB generating the dynamic Stub at runtime according to an external library mechanism.

44. The computer-accessible medium as recited in claim 43, wherein the external library is a Byte Code Engineering Library (BCEL).

45. The computer-accessible medium as recited in claim 40, wherein the client-side ORB comprises a pluggable interface configured to accept one of two or more different dynamic Stub generation mechanisms configured to generate dynamic Stubs at runtime, and wherein the program instructions are further configured to implement plugging in one of the dynamic Stub generation mechanisms to generate the dynamic Stub.

46. The computer-accessible medium as recited in claim 45, wherein the dynamic Stub generation mechanisms include a dynamic Proxy mechanism and an external library mechanism.

47. The computer-accessible medium as recited in claim 40, wherein the object is an Enterprise JavaBean (EJB).

48. The computer-accessible medium as recited in claim 40, wherein the program instructions are further configured to implement the client-side ORB loading one or more statically generated Stubs as remote interfaces to one or more objects hosted on the application server for client processes that do not support the generation of dynamic Stubs at runtime.

49. A system, comprising:

a processor; and a memory comprising program instructions, wherein the program instructions are executable by the processor to implement an Object Request Broker (ORB) configured to:

accept one of two or more pluggable dynamic Stub generation mechanisms each configured to generate dynamic Stubs at runtime;

generate at runtime a dynamic Stub as a remote interface to an object hosted on an application server for a client process on the system according to the pluggable dynamic Stub generation mechanism; and communicate invocations on the dynamic Stub by the client process to a server-side ORB according to Remote Method Invocation-Internet Inter-ORB Protocol (RMI-IIOP).

50. The system as recited in claim 49, wherein the client-side ORB is further configured to:

accept a different one of the two or more different pluggable dynamic Stub generation mechanisms;

generate at runtime a different dynamic Stub as a remote interface to the object hosted on the application server for the client process on the system according to the different pluggable dynamic Stub generation mechanism; and communicate invocations on the different dynamic Stub by the client process to the server-side ORB according to RMI-IIOP.

51. The system as recited in claim 49, wherein the pluggable dynamic Stub generation mechanisms include a dynamic Proxy mechanism and an external library mechanism.

52. The system as recited in claim 51, wherein the external library is a Byte Code Engineering Library (BCEL).

53. The system as recited in claim 49, wherein the object is an Enterprise JavaBean (EJB).

54. The system as recited in claim 49, wherein the client-side ORB is further configured to load statically generated Stubs as remote interfaces to the objects hosted on the application server for client processes that do not support the generation of dynamic Stubs at runtime.

* * * * *